United States Patent [19]
Paul et al.

[11] Patent Number: 5,384,437
[45] Date of Patent: Jan. 24, 1995

[54] TORQUE BAR SUSPENSION SCALE WITH STRAP ASSEMBLIES

[75] Inventors: John Paul; Adrian J. Paul, both of Duncan, Okla.

[73] Assignee: Adrian J. Paul Company, Duncan, Okla.

[21] Appl. No.: 192,474

[22] Filed: Feb. 7, 1994

Related U.S. Application Data

[63] Continuation of Ser. No. 32,088, Mar. 17, 1993, Pat. No. 5,308,935, which is a continuation of Ser. No. 975,030, Nov. 12, 1992, Pat. No. 5,320,395, which is a continuation of Ser. No. 731,558, Jul. 17, 1991, Pat. No. 5,205,370.

[51] Int. Cl.⁶ .............................................. G01G 21/08
[52] U.S. Cl. ................................ 177/256; 177/DIG. 9
[58] Field of Search ................. 177/257, DIG. 9, 256

[56] References Cited

U.S. PATENT DOCUMENTS

| | | | |
|---|---|---|---|
| Re. 32,002 | 10/1985 | Shoberg et al. | 177/DIG. 9 |
| Re. 32,003 | 10/1985 | Shoberg | 177/DIG. 9 |
| 197,489 | 11/1877 | Onslow | 177/DIG. 9 |
| 1,790,509 | 1/1931 | Moyer | 177/DIG. 9 |
| 2,736,549 | 2/1956 | Paul | 177/DIG. 9 |
| 4,023,634 | 5/1977 | Provi et al. | 177/DIG. 9 |
| 4,050,532 | 9/1977 | Provi et al. | 177/DIG. 9 |
| 4,561,511 | 12/1985 | Stuart | 177/DIG. 9 |
| 4,836,304 | 6/1989 | Paul | 177/DIG. 9 |
| 5,205,370 | 4/1993 | Paul | 177/DIG. 9 |

OTHER PUBLICATIONS

Broch. "Paul Livestock Scale Sales", Assembly Instr. No Date.
Broch "Kevlar ®, The Uncommon Material For Uncommon Solutions"; E. I. Du Pont de Nemours & Co. (Inc.) H-05500-1.
"Kevlar ®, When Your Elastomeric Application Calls For Reinforcement, Call On Easy To Disperse Kevlar ® M/B".
"Kevlar ® in Conveyor Belts", E. I. Du Pont de Nemours & Co. (Inc.), #76164.
"Presenting Kevlar ® Aramid Fiber", H-24224, May 19, 1990.

*Primary Examiner*—George H. Miller, Jr.
*Attorney, Agent, or Firm*—Dunlap, Codding & Lee

[57] ABSTRACT

A torque bar suspension scale having a platform for supporting objects to be weighed and a pair of torque bars with each torque bar being disposed at an opposite end of the platform. Strap assemblies are connected to the platform, the torque bars and a frame whereby the torque bars are rotated in response to a weight being disposed on the platform. Each strap assembly comprises a strap having a rectangularly shaped cross section.

6 Claims, 4 Drawing Sheets

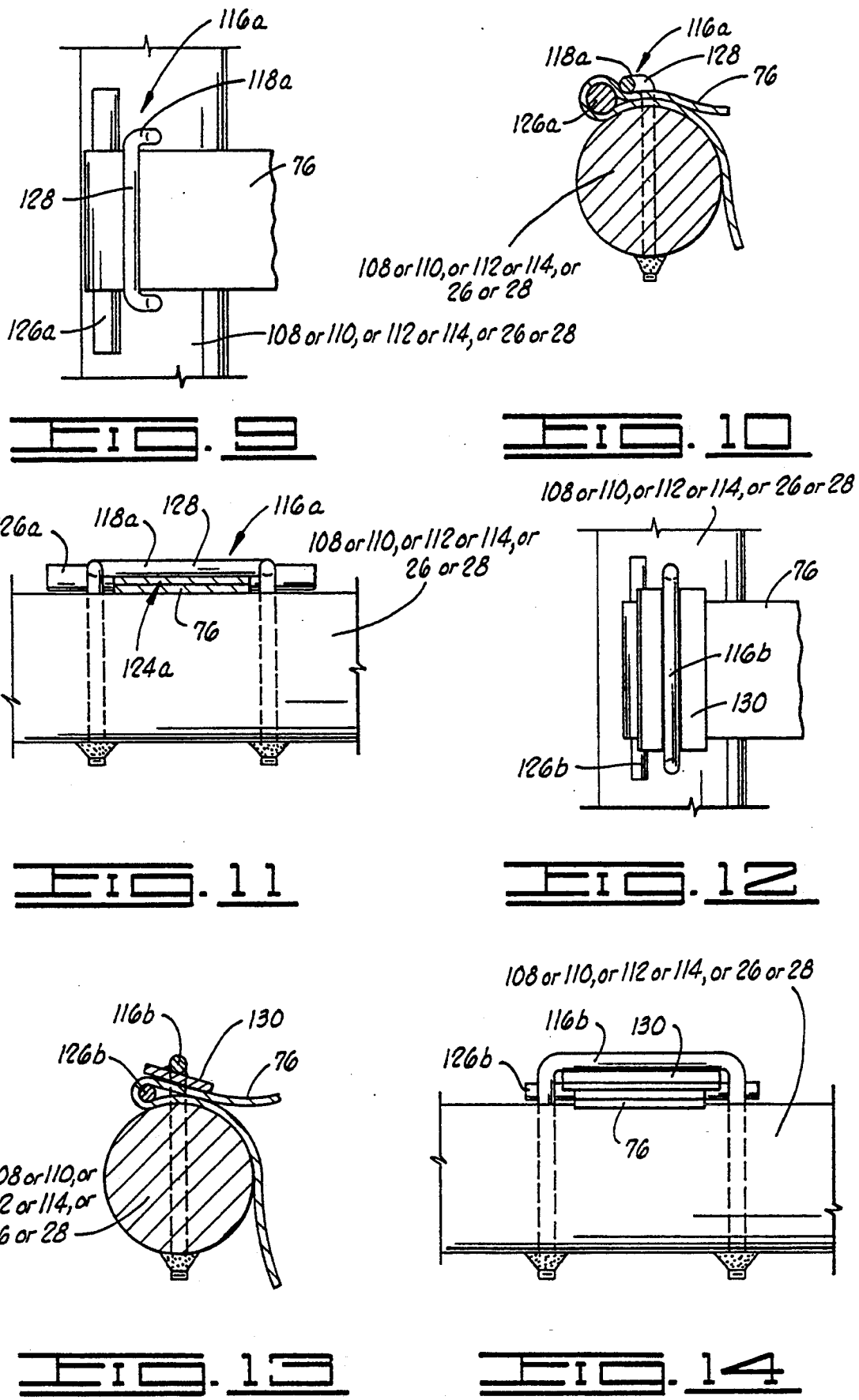

000
TORQUE BAR SUSPENSION SCALE WITH STRAP ASSEMBLIES

RELATED APPLICATIONS

This application is a continuation of U.S. Ser. No. 08/032,088, filed on Mar. 17, 1993, now U.S. Pat. No. 5,308,935 entitled "TORQUE BAR SUSPENSION SCALE WITH STRAP ASSEMBLIES" which is a continuation of U.S. Ser. No. 07/975,030, filed Nov. 12, 1992 U.S. Pat. No. 5,230,395, entitled "TORQUE BAR SUSPENSION SCALE WITH STRAP ASSEMBLIES", now U.S. Pat. No 5,320,395 issued Jul. 27, 1993, which is a continuation of U.S. Ser. No. 07/731,558, filed Jul. 17, 1991, entitled "TORQUE BAR SUSPENSION SCALE WITH STRAP ASSEMBLIES", now U.S. Pat. No 5,205,370 issued Apr. 27, 1993.

FIELD OF THE INVENTION

The present invention relates to a torque bar suspension scale wherein strap assemblies are connected to a platform and to torque bars and to a frame whereby the torque bars are rotated in response to a weight being disposed on the platform, each of the strap assemblies comprising a strap having a rectangularly shaped cross section.

BRIEF DESCRIPTION OF THE DRAWINGS

FIG. 9 is a top plan view another modified clamp assembly for connecting the strap assembly to the platform or to the torque bar or the frame.

FIG. 10 is a sectional view of the modified clamp assembly of FIG. 9.

FIG. 11 is an end elevational view of the modified clamp assembly of FIG. 9.

FIG. 12 is a top plan view of yet another modified assembly for connecting the strap to the platform or to the torque bar or the frame.

FIG. 13 is a sectional view of the modified clamp assembly of FIG. 14.

FIG. 14 is a end elevational view of the modified clamp assembly of FIG. 12.

DESCRIPTION OF THE PREFERRED EMBODIMENTS

Figure 1:
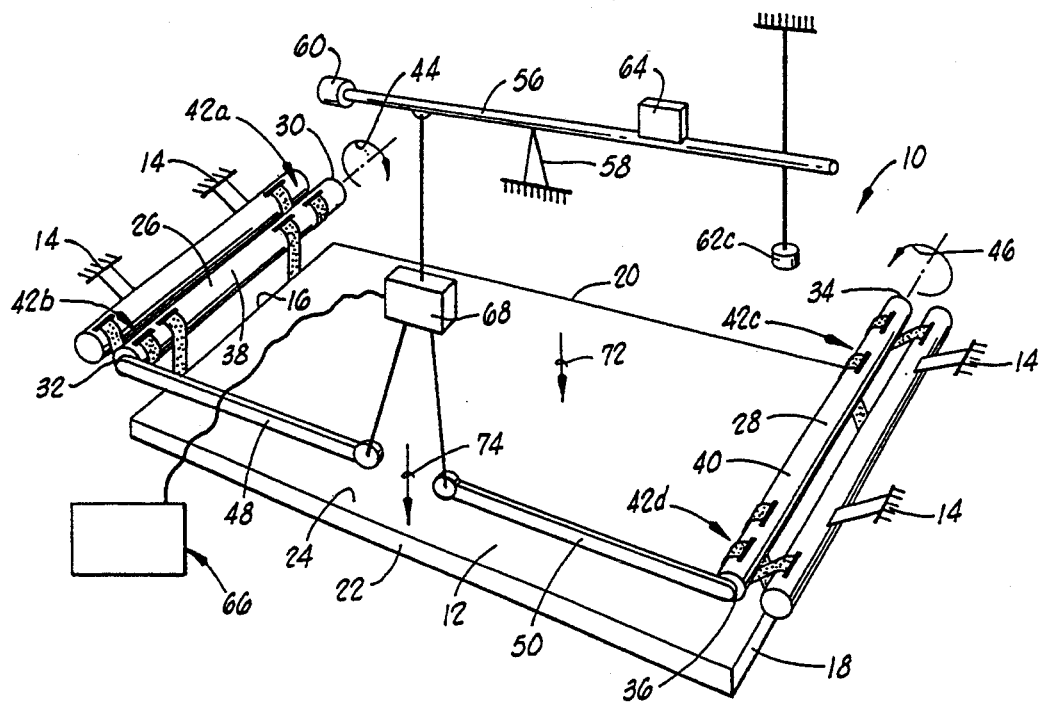
FIG. 1 is a diagrammatic, schematic view of a torque bar suspension scale constructed in accordance with the present invention.
Figure 2:
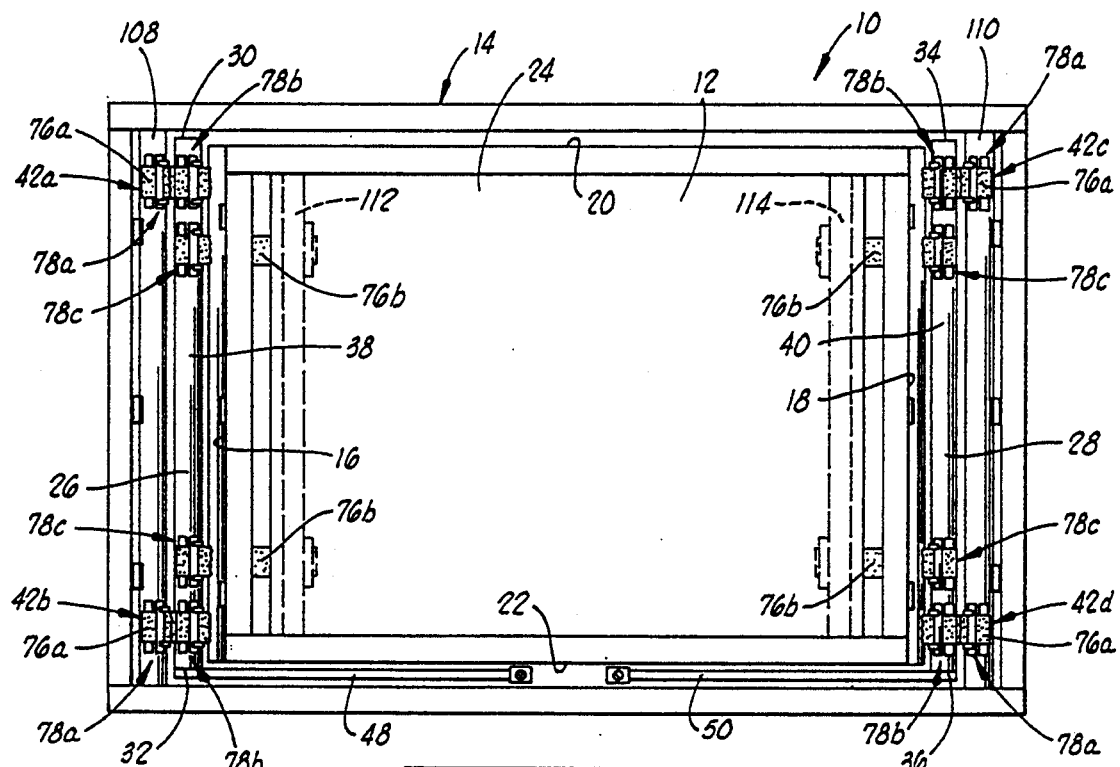
FIG. 2 is a top plan view of the torque bar suspension scale shown in FIG. 1, but showing the details of a frame and strap assemblies of the torque suspension scale.

Shown in FIG. 1 is a schematic, diagrammatic view of a torque bar suspension scale 10 constructed in accordance with the present invention and FIG. 2 is a top plan view of the torque bar suspension scale 10 shown in FIG. 1, but showing the frame and the platform in greater detail. The torque bar suspension scale 10 includes a rectangularly shaped platform 12 and a rectangularly shaped frame 14 which is disposed generally about the platform 12. The platform 12 has a first end 16, a second end 18, a first side 20, a second side 22 and an upper surface 24. The platform 14 is adapted to support an object to be weighed on the surface 24 during the weighing process.

A first torque bar 26 is disposed near the first end 16 of the platform 12 and a second torque bar 28 is disposed near the opposite second end 18 of the platform 12. The first and the second torque bars 26 and 28 each are spaced a distance from the respective opposite ends 16 and 18 of the platform 12. The first and the second torque bars 26 and 28 each extend generally parallel with the respect opposite first and second ends 16 of the platform 12.

The first torque bar 26 is cylindrically shaped and has a first end 30 and a second end 32. The second torque bar 28 is cylindrically shaped and has a first end 34 and a second end 36. The first torque bar 26 has an outer peripheral surface 38 and the second torque bar 28 has an outer peripheral surface 40.

The torque bar suspension scale 10 includes a plurality of strap assemblies 42 with the individual strap assemblies being designated in FIGS. 1 and 2 by the respective reference numerals 42a, 42b, 42c and 42d. The strap assemblies 42a and 42b are connected to the platform 12, the first torque bar 26 and the frame 14 for rotatingly supporting the first torque bar 26 such that the first torque bar 26 is rotated in a direction 44 (FIG. 1) in response to a weight being disposed or imposed on the upper surface 24 of the platform 12. The strap assemblies 42c and 42d are connected to the platform 12, the second torque bar 28 and the frame 14 for rotatingly supporting the second torque bar 28 such that the second torque bar 28 is rotated in a direction 46 (FIG. 1) in response to a weight being disposed or imposed on the upper surface 24 of the platform 12.

One end of a lever arm 48 is connected to the first torque bar 26. One end of a lever arm 50 is connected to the second torque bar 28.

One end of a flexible cable 52 (FIG. 1) is connected to one end of the lever arm 48 and one end of a flexible cable 54 (FIG. 1) is connected to one end of the lever arm 50. The opposite ends of the cable 52 and 54 are connected to a conventional weighing beam 56 (FIG. 1).

The weighing beam 56 is balanced on a fixed knife edge support 58 (FIG. 1) with a zero balance tail ball 60 (FIG. 1) on one end and a balance to hold weight multipliers 62 (FIG. 1) at the opposite end. A movable poise 64 (FIG. 1) is positionable to provide the exact balance so the weight on the platform 12 may be visually read from the weight graduation marks stamped on the weighing beam 56.

A weighing unit 66 (FIG. 1) is operatively connected to the torque bar suspension scale 10. In general, the weighing unit 66 comprises a transducer 68 (FIG. 1) and a weight processor 70 (FIG. 1). The weighing beam 56 is connected to the frame 14 and the transducer 68 is interposed in the cables 52 and 54, generally between the lever arms 48 and 50 and the weighing beam 56. By fixing the weighing beam 56 to the frame 14, all of the forces transmitted through the cable 52 and 54 are imposed on the transducer 68.

The transducer 68 is constructed and adapted to receive the mechanical forces transmitted through the cables 52 and 54 which are proportional to the instantaneous weight of the object or weight on the platform 12 at any given time and to output weight signals which are electrical signals indicative of the instantaneous weight on the platform 12. The weight signals output by the transducer 68 are analog signals. However, it should be noted that the transducer 68 could be constructed to include an analog to digital section so the transducer 68 would output the weight signals in a digital format. The weight processor 70 outputs in a visual perceivable format the weight of the object on the platform 12 and the weight processor 70 can output the weight on the platform 12 in a visually perceivable format such as a printed format, for example.

Weight processors which are constructed and operate like the weight processor 70 just described are disclosed in detailed in U.S. Pat. No. 4,836,304, issued to John Paul, Jun. 6, 1989 and the disclosure of this patent hereby specifically is incorporated herein by reference.

In operation, an object is placed on the platform 12, thereby exerting a weight force on the platform 12 in a general direction 72 (FIG. 1). The weight force on the platform 12 exerts torque on the first and the second torque bars 26 and 28 rotating the first and the second torque bars 26 and 28 in the respective directions 44 and 46. These torque forces on the first and the second torque bars 26 and 28 result in the lever arms 48 and 50 being forced in a generally downwardly direction 74 (FIG. 1), thereby placing downwardly directed forces on the cables 52 and 54 which are indicative of the instantaneous weight of the object on the platform 12. In general, these downwardly directed forces are imposed on the weighing beam 56 and these forces are counter-balanced by the operator moving the poise 64 to provide the visually perceivable output indication of the weight of the object. In addition, the weighing unit 66 outputs the weight of the object in a visually perceivable format and/or in a printed format.

Scales of the type just generally described with respect to the torque bar suspensions scale 10 and without the incorporation of the strap assemblies 42 of the present invention are commercially available from Adrian J. Paul Company of Duncan, Okla., and the construction and operation of such scales are well known in the art. In addition, a scale of the type just described with respect to the torque bar suspension scale 10 and without the incorporation of the strap assemblies 42 is described in detail in U.S. Pat. No. 2,736,549, issued to C. K. Paul, 1956, and the disclosure of this patent specifically is incorporated herein by reference.

In the prior scale available from Adrian J. Paul, Co., Inc. and described in U.S. Pat. No. 2,736,549, cables having circularly shaped cross sections where connected to the platform, the torque bars and the frame for rotatingly supporting the torque bars, whereas, in the present invention, the first and the second torque bars 26 and 28 are rotatingly supported and connected to the platform 12 and the frame 14 by way of the strap assemblies 42.

As mentioned before, the prior art torque bar suspension scales such as those sold by the Adrian J. Paul, Co., Inc. and described in U.S. Pat. No. 2,736,549, utilized cables having circular cross-sections for connecting the torque bars to the platform and to the frame. These cables were metal stranded cables, that is, a cable made up of a plurality of metal strands each having circularly cross section intertwined or interwoven to form the metal stranded cable.

When such metal stranded cables were wrapped about the cylindrically shaped torque bars, this resulted in the cable strands adjacent the torque bars being under compression while the cable strands outermost from the torque bars were in tension. This resulted in a greater force being placed on the cable strands outermost from the torque bars. In fact, the outermost cable strands carried virtually the entire load while the innermost cable strands adjacent the torque bars carried virtually very little of the load. This resulted in the outer most cable strands being stressed resulting in breaking.

When the cable strands break, the cable had to be replaced and this was a time consuming process. Further, if an individual was in the process of weighing cattle for example, the entire weighing process had to be halted or ceased when it became necessary to replace broken cables.

In addition, as the platform swung, the cable strands work hardened and this resulted in a greater tendency for the cable strands to break again resulting in a need to replace such cables.

Further, any part of the stranded cable which is subjected to abnormal strain was more subject to corrosion. If the stranded cable was secured to the torque bar or to the platform or to the frame by way of a bolt and plate type of structure, the stranded cable was mashed and subjected to abnormal strain. Again, this resulted in corrosion and breakage of the cable strands requiring replacement of the cables.

Using the stranded cables to support the platform also resulted in limiting the capacity of the torque bar suspension scale. A larger diameter stranded cable should result in a larger load carrying capacity. For example if the diameter of the standard stranded cable was doubled, this should increase the load carrying capacity by a factor 4. However, this actually resulted in the increase of the diameter of the torque bar because one can not wrap a large diameter stranded cable around a small diameter torque bar. The overall result was an increase in the circumference of the outermost cable strands carrying the bulk of the load which reduced the capacity of the torque bar suspension scale.

In addition, a large diameter torque bar for accommodating large diameter stranded cables resulted in a need for a longer length lever arm. There are space limitations with respect to the size of a torque bar suspension scale so it was not practical to make the lever arm longer past a certain practical length.

In short, stranded metal cables have posed problems in the past for torque bar suspension scales, namely cable breakage and scale capacity limitations. The strap assemblies 42 of the present invention overcome all of these problems.

Figure 3:
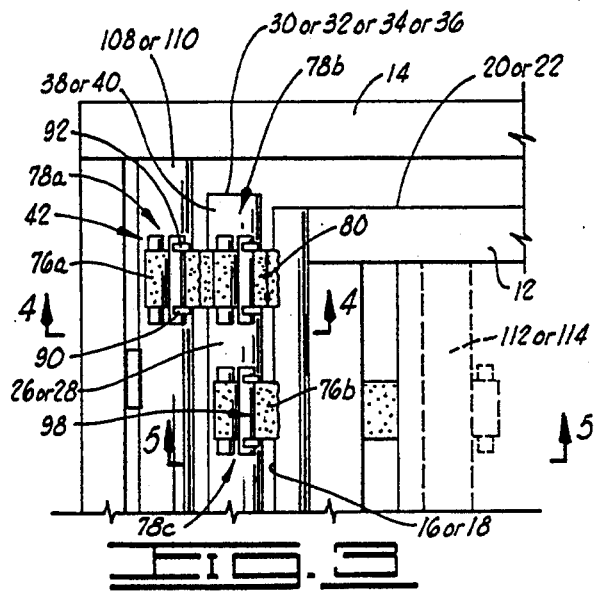
FIG. 3 is an enlarged view of a typical corner of the torque bar suspension scale shown in FIG. 1 showing a top plan view of a typical strap assembly connected to the platform, a torque bar and a portion of the frame.
Figure 4:
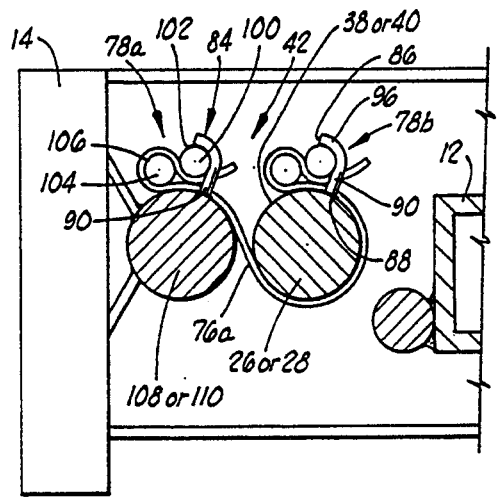
FIG. 4 is a sectional view taken substantially along the 4—4 of FIG. 3.
Figure 5:
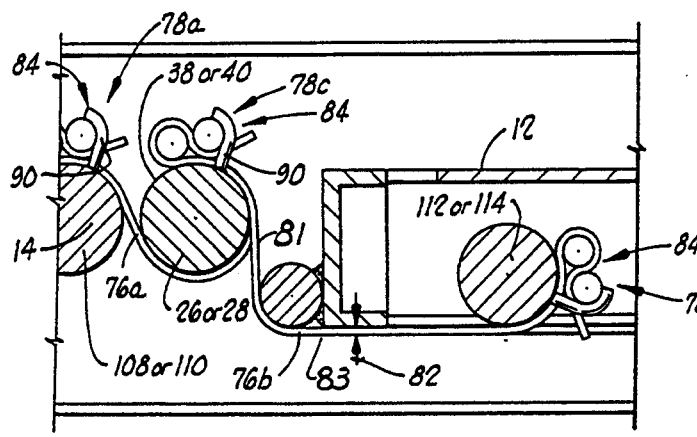
FIG. 5 is a sectional view taken substantially along the lines 5—5 of FIG. 3.

The strap assemblies 42 are shown in greater detail in FIGS. 3, 4 and 5. Each strap assembly 42 comprises two straps 76 with the individual straps being designated in FIGS. 3, 4 and 5 by the respective reference numerals 76a and 76b. Each strap assembly 42 also includes four clamp assemblies with the individual clamp assemblies being designated in FIGS. 3, 4 and 5 by the respective reference numerals 78a, 78b, 78c and 78d.

The strap 78a is connected to the frame 14 by way of the clamp 78a and the strap 78a is connected to the torque bar 26 or 28 by way of the clamp assembly 78b. The strap 76b is connected to the torque bar 26 or 28 by way of the clamp assembly 78c and the strap 76b is connected to the platform 12 by way of the clamp assembly 78d. The straps 76a and 76b are identical in construction and operation and the clamp assemblies 78a, 78b, 78c and 78d each are identical in construction and operation.

Each of the straps 76 has a generally rectangularly shaped cross section. Each of the straps 76 has a length, a width 80 and a thickness 82, the width 80 being shown in FIG. 3 with respect to the strap 76a and the thickness 82 being shown in FIG. 5 with respect to the strap 76b. In one preferred embodiment, the width 80 of the strap 76 is about 1⅜ inches and the thickness 82 is about 1/6th inch. The width 80 is about 25 times greater than the thickness 82. The width 80 preferably is at least two times greater than the thickness 82.

Each strap 76 has a substantially flat upper surface 81 and a substantially flat lower surface 83 forming the width 80 of the straps 76. The edges of each of the straps 76 also preferably are substantially flat to form the rectangularly shaped cross section; however, the edges may be rounded and the term "rectangularly shaped" as used herein is intended to cover flat or rounded edges of the straps 76.

The strap 76 preferably is constructed of Kevlar ® aramid fibers, Kevlar ® aramid fibers being a product of E. I. du Pont de Nemours and Co. (Inc.) of Wilmington, Del. with the Kevlar ® aramid fibers being intertwined to form narrow webbing with such narrow webbing comprising the strap. The narrow webbing Kevlar ® product is commercially available from Bally Ribbon Mills, pattern 2309. As used herein, the term Kevlar ® means the Kevlar ® produced by DuPont or the equivalent.

When the Kevlar ® webbing is cut to form the straps 76, the cut ends of the webbing tend to become frayed. Therefore, each end of each strap 76 preferably is dipped into an elastomeric or cold tar compound which will harden to some degree and cooperate to adhesively connect the frayed ends and substantially prevent further fraying. Further, the exposed portions of the straps 76 preferably are dipped in an elastomeric or coal tar compound to protect the individual strands from being cut by sharp objects.

The clamp assemblies 78 are identical in construction and operation. Each clamp assembly comprises a clamp 84 (FIGS. 4 and 5) having a first end 86 and a second end 88 (the first and the second ends 86 and 88 being designated in FIG. 4 only with respect to one of the clamps 84). The first end 86 of each clamp 84 is connected to the torque bar 26 or 28 or a portion of the frame 14 or a portion of the platform 12. Each clamp 84 extends a distance radially outwardly from the torque bar 26 or 28 or from a portion of the platform 12 or from a portion of the frame 14 terminating with the second 88 thereof.

As shown in FIGS. 3, 4 and 5, the clamps 84 each more particularly comprise a first clamp rod 90 and a second clamp rod 92. Each of the clamp rods 90 and 92 has a first end and a second end which cooperate to comprise the first and the second ends 86 and 88 of the clamp 84. The first end of each clamp rod 90 and 92 is connected to the torque bar 26 or 28 or a portion of the frame 14 or a portion of the platform 12 and each of the clamp rods 90 and 92 extends a distance generally radially outwardly from the torque bar 26 or 28 or a portion of the frame 14 or a portion of the platform 12 terminating with the second ends thereof. The first clamp rod 90 is spaced a distance from the second clamp rod 92. The distance between the clamp rods 90 and 92 is sized to be sufficient so that one of the straps 76 may be extended between the first and the second clamp rods 90 and 92.

A portion of each of the first and the second clamp rods 90 and 92 near the second ends thereof is formed at an angle to provide a retaining portion 96 (the retaining portion 96 being shown in FIG. 4 with respect to one of the first clamp rods 90). The retaining portion is spaced a distance above the outer peripheral surface 38 or 40 of the first or the second torque bars 26 or 28 or spaced a distance above a portion of the platform 12 or a distance above a portion of the frame 14. The retaining portion 96 extends in a direction generally opposite the direction in which force is applied to the strap 76 tending to pull the strap out of the clamp 84. The spacing between the first and the second clamp rods 90 and 92 and a portion of the surface of the first or the second torque bars 26 or 28 or the platform 12 or the frame 14 between the first and the second clamp rods 90 and 92 cooperate to form a strap opening 98 which is slightly larger than the width 80 of the strap 76 so that the strap 76 may be slidingly disposed through the strap opening 98 during the operation of the strap assemblies 42.

Each clamp assembly 78 also comprises a first retaining rod 100 having an outer peripheral surface 102 and a second retaining rod 104 having an outer peripheral surface 106 (only one of the retaining rods 100 and only one of the retaining rods 104 being designated with a reference numeral in FIG. 4 and only the outer peripheral surface 102 and the outer peripheral surface 106 of one of the retaining rods 100 and one of the retaining rods 104 is designated with a reference numeral in FIG. 4). The first retaining rod 100 is disposed generally adjacent the first and the second clamp rods 90 and 92 and the first retaining rod 100 extends generally between the first and the second clamp rods 90 and 92 encompassing the strap opening 94. A portion of the first retaining rod 100 is disposed generally under the retaining portion 96 formed on each of the first and the second clamp rods 90 and 92. The second retaining rod 104 is disposed near the first retaining rod 100 and the second retaining rod 104 extends in a plane about parallel with the first retaining rod 100. The first and the second retaining rods 100 and 104 each are disposed generally on the outer peripheral surface 38 or 40 of the first or second torque bars 26 or 28 or on a portion of an outer peripheral surface of the platform 12 or a portion of the outer peripheral surface of the frame 14.

As shown in FIGS. 2, 3, 4 and 5, a cylindrically shaped bar 108 is secured to the platform 12 near the first torque bar 26 and the bar 108 extends generally parallel and spaced a distance from the first torque bar 26. Another cylindrically shaped bar 110 is secured to the platform 12 near the second torque bar 28 and the bar 110 extends generally parallel with and is spaced a distance from the second torque bar 28. The first and the second bars 108 and 110 each comprise a portion of the frame 12. The clamp assemblies 78a more particularly are connected to either the bar 108 or the bar 110 for connecting the strap 76 to the frame 14.

A cylindrically shaped bar 112 (FIGS. 2 and 5) is secured to the under surface or lower surface of the platform 14 near the first end 16 of the platform 14 and the bar 112 extends generally between the first and the second sides 20 and 22 of the platform 12. Another cylindrically shaped bar 114 (FIGS. 2 and 5) is secured to the under surface or lower surface of the platform 12 generally near the second end 18 of the platform 12. The bar 114 extends generally between the first and the second sides 20 and 22 of the platform 12. The clamp assemblies 78d more particularly are connected to the bar 112 or the bar 114 with the bars 112 and 114 each comprising a portion of the platform 12.

One end of each of the straps 76a is connected to the bar 108 or the bar 110 and the opposite end of each of the straps 76 is connected to the torque bar 26 or 28.

As shown more clearly in FIGS. 4 and 5, one end of each of the straps 76a extends through the strap opening 98 of the clamp assembly 76a and is extended under the first retaining rod 100 and under the second retaining rod 104 and extended about a portion of the outer peripheral surface of the second retaining rod 104. The strap 76a extends about a portion of the outer peripheral surface of the second retaining rod 104 and is extended back under and about a portion of the outer peripheral surface 102 of the first retaining rod 100 and again extended back through the strap opening 98.

The opposite end of each strap 76a extends from the bar 108 or 110 and is wrapped about a portion of the outer peripheral surface 38 or 40 of the torque bar 26 or 28. The strap 76a extends about the outer peripheral surface 38 or 40 of the first or second torque bar 26 or 28 and is extended through the strap opening 98 of the clamp assembly 78b. The strap 76a extends through the strap opening 98 of the clamp assembly 78b and extends under the first and the second retaining rods 100 and 104 and extends about a portion of the outer peripheral surface 106 of the second retaining rod 104. The strap 78b extends from the second retaining rod 104 back under and about a portion of the outer peripheral surface 102 of the first retaining rod 100 with the end of the strap 78b being again extended back through the strap opening 98 of the clamp assembly 78b.

As shown more clearly in FIG. 5, the clamp assembly 78c also is connected to the first or second torque bars 26 or 28 and the clamp assembly 78d is connected to a portion of the platform 12. More particularly, two of the clamp assemblies 78d are connected to the bar 112 and two of the clamp assemblies 78d are connected to the bar 114.

One end of the strap 78b is connected to the clamp assembly 78c to connect one end of the strap 78b to the first or the second torque bar 26 or 28 and the opposite end of the strap 76b is connected to the clamp assembly 78d to connect the opposite end of the strap 76b to the platform 12. More particularly, one end of each strap 76b extends through the strap opening 98 in one of the clamp assemblies 78c and under the first and second retaining rods 100 and 104 and about a portion of the outer peripheral surface 106 of the second retaining rod 104. The end of the strap 76b extends from the second retaining rod 104 under and about a portion of the outer peripheral surface 102 of the first retaining rod 100 and again back through the strap opening 98 in the clamp assembly 78d.

The strap 76b extends about a portion of the outer peripheral surface 38 or 40 of the first or second torque bars 26 and 28 and extends from the first or second torque bars 26 or 28 to one of the clamp assemblies 78d for connecting the opposite end of the strap 76b to the platform 12. More particularly, the opposite end of the strap 76b extends from the first or the second torque bar 26 or 28 about a portion of the outer peripheral surface of the bar 112 or 114 and through the strap opening 98 in the clamp assembly 78d. This end of the strap 76b extends from the strap opening 98 of the clamp assembly 78d under the first and second retaining rods 100 and 104 and about a portion of the outer peripheral surface of the second retaining rod 104. From the second retaining rod 104 the strap 76b extends under and about a portion of the outer peripheral surface 102 of the first retaining rod 100 and again back through the strap opening 98 of the clamp assembly 78d.

The weight of the platform 12 imposes a force pulling the torque bars 26 and 28 in the downwardly direction 72. When the torque bars are pulled in the downwardly direction 72, the strap 76a tends to be pulled in a direction pulling the strap 76a out of the strap opening 98 of the clamp assembly 78a; however, the first and the second retaining rods 100 and 104 of the clamp assembly 78a jam against the first and the second clamp rods 90 and 92 and against portions of the strap 78a jamming the strap 78a against the platform 12 or, more particularly, the bar 108 or 110, thereby securing the strap 76a connected to the clamp assembly 78a. The greater the force tending to pull the straps 78a out of the clamp assembly 78a, the greater the force jamming the first and the second clamp rods 90 and 92 against the strap and against the platform for securing the strap connected to the clamp assembly 78a.

In a like manner, the retaining rods 100 and 104 of the clamp assembly 78b are jammed against the first and the second clamp rods 90 and 92 and jammed against the strap 78a and against portions of the first or the second torque bars 26 or 28 for securing the opposite end of the strap 78a to the first or the second torque bar 26 or 28.

The clamp assemblies 78c are secured to the torque bars 26 or 28 and the clamp assemblies 78d are secured to portions of the platform 12 or, more particularly, the bars 112 or 114 such that the force imposed by the weight of the platform in the downwardly direction 72 pulls on the strap 76b in such a manner that the first and the second retaining rods 100 and 104 of the clamp assembly 78c jam against the first and the second clamp rods 90 and 92 jamming the first and the second retaining rods 100 and 104 against the strap 76b and against the first or the second torque bars 26 or 28 for securedly connecting one end of the strap 76b to the clamp assembly 78c, and the first and the second retaining rods 100 and 104 of the clamp assemblies 78d are jammed against the first and the second rods 90 and 92 and against portions of the strap 76b for jamming the strap 76b against the bar 112 or 114 for securedly connecting the opposite end of the strap 76b to the bar 112 or 114. When an object to be weighed is placed on the platform, this causes an additional force to be applied to the torque bars 26 and 28 in the downwardly direction 72 and this additional force merely tightens the gripping engagement of the clamp assemblies 78 to the straps 76 in a manner like that described before.

EMBODIMENT OF FIGS. 6, 7 AND 8

Figure 6:
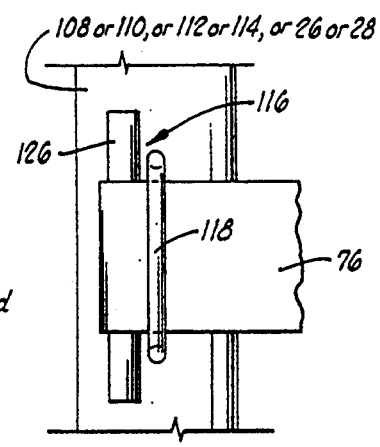
FIG. 6 is a top plan view of a modified clamp assembly for connecting the strap to the torque bar or the frame or to the platform of the torque bar suspension scale.
Figure 7:
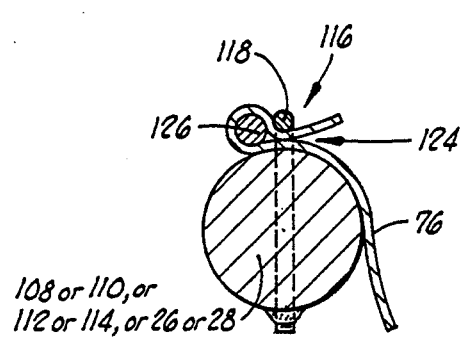
FIG. 7 is a sectional view of the modified claim assembly of FIG. 6.
Figure 8:
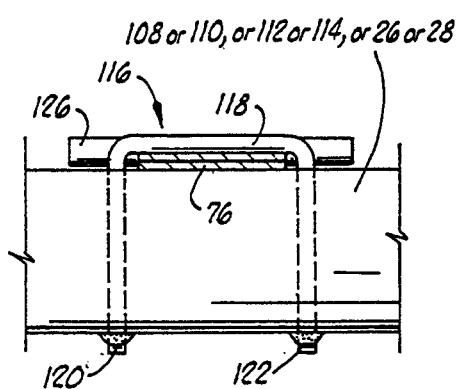
FIG. 8 is an end elevational view of the modified claim assembly of FIG. 6.

Shown in FIGS. 6, 7 and 8 is a modified clamp assembly 116 which can be utilized in lieu of the clamp assemblies 78 or in lieu of some of the clamp assemblies 78 if desired in a particular application.

Each clamp assembly 116 comprises a U-shaped rod 118 having opposite ends 120 and 122. Portions of the U-shaped rod 118 extend through the bars 108 or 110 or through the bars 112 or 114 or through the torque bars 26 or 29 and portions of the U-shaped rod 118 near the ends 120 and 122 are secured to the bars 108 or 110 or the bars 112 or 114 or the first or the second torque bars 26 or 28. The U-shaped rod 118 is secured to the bars 108 or 110 or the bars 112 or 114 or the first or the second torque bars 26 or 28 in such a manner that a portion of the U-shaped bar extends a distance above the outer peripheral surface of the bar 108 or 110 or the bar 112 or 114 or the first or the second torque bars 26 or 28 forming a strap opening 124 sized to slidingly receive a portion of one of the straps 76.

Each clamp assembly 116 also includes a cylindrically shaped retaining rod 126. The retaining rod 126 is disposed near the U-shaped rod 118 and extends generally across the strap opening 124.

One end of the one of the straps 76 extends through the strap opening 124 and extends about a portion of the outer peripheral surface of the retaining rod 126 and back through the strap opening 124. In this embodiment, when a force is imposed tending to pull the strap out of the strap opening 124, the retaining rod 126 jams the strap 76 against the outer peripheral surface of the bar 108 or 110 or the bar 112 or 114 or the first or the second torque bars 26 or 28 and against portions of the U-shaped rod 118 for securely connecting the strap 76 to the bar 108 or 110 or the bar 112 or 114 or the first or the second torque bar 26 or 28. The clamp assembly 116 will operate essentially like the clamp assembly 78 described in detail before, except the clamp assembly 116 requires only one retaining rod 126 whereas the clamp assembly 78 described before required the two retaining rods 100 and 104.

EMBODIMENT OF FIGS. 9, 10 AND 11

Shown in FIGS. 9, 10 and 11 is another modified clamp assembly 116a. The clamp assembly 116a includes a modified U-shaped rod 118a which is connected to the bar 108 or 110 or the bar 112 or 114 or the first or the second torque bars 26 or 28 in a manner exactly like that described before with respect to the U-shaped rod 118 shown in FIGS. 6, 7 and 8. The U-shaped rod 118a is shaped exactly like the U-shaped rod 118 described before, except a portion of the U-shaped rod is bent at an angle and extends a distance over the outer peripheral surface of the bar 108 or 110 or the bar 112 or 114 or the first or the second torque bars 26 or 28 forming a retaining portion 128. The retaining portion 128 formed on the U-shaped rod 118a cooperates to more effectively jam the retaining rod 126 against the U-shaped rod 118a for securing the strap 76 to the bar 108 or 110 or the bar 112 or 114 or the first or the second torque bars 26 or 28.

EMBODIMENT OF FIGS. 12, 13 AND 14

Shown in FIGS. 12, 13 and 14 is another modified clamp assembly 116b which is constructed exactly like the clamp assembly 116 shown in FIGS. 6, 7 and 8 and described in detail before, except the clamp assembly 116b includes a wedge bar 130. The wedge bar 130 is disposed through the strap opening 124b and extends a distance generally above the retaining rod 126. The wedge bar 130 cooperates with the retaining rod 126b in securely connecting the strap 76 to the bar 108 or 110 or the bar 112 or 114 or the first or the second torque bars 26 or 28.

EMBODIMENT OF FIG. 15

Figure 15:
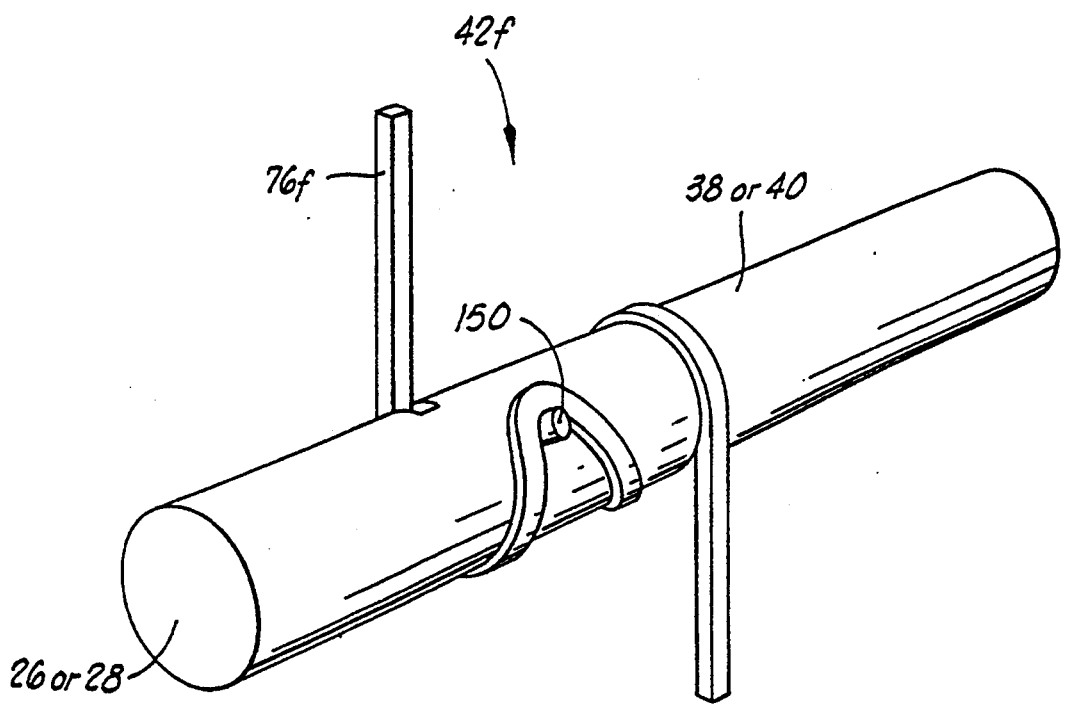
FIG. 15 is a perspective view of a portion of a first or second torque bar having a modified strap wrapped thereabout in a modified manner.

Shown in FIG. 15 is a modified connection of a modified strap 76f to the torque bars 26 and 28. In some instances, when the width of the strap 76f is small enough, each strap assembly 42f can be connected to the platform 12, the frame 14 and the torque bars 26 or 28 via a single strap 76f in a manner like stranded wire cables presently are connected to torque bars in prior art extending commercial torque bar suspension scales. This modified version is illustrated in FIG. 15.

As shown in FIG. 15, the strap 76f is connected to the frame 14 by way of the clamp assembly 78 in a manner exactly like that described before and the strap 76f extends from the frame 14 and is wrapped about a portion of the outer peripheral surface 38 or 40 of the torque bar 26 or 28. The strap 76f then is wrapped about a post 150 secured to the outer peripheral surface 38 or 40 of the torque bar 26 or 28 and the strap 76f then is wrapped in an opposite direction about the outer peripheral surface 38 or 40 of the torque bar 26 or 28. The strap 76f then is extended from the torque bar 26 or 28 to the platform 12 where the strap 76f is connected to the platform 12 by way of the clamp assembly 76 in a manner exactly like that described before.

As shown in FIG. 15, the strap assembly 42f represents any one or all of the four straps utilized to connect the first and the second torque bars 26 and 28 to the frame 14 and the platform 12.

EMBODIMENT OF FIG. 16

Figure 16:
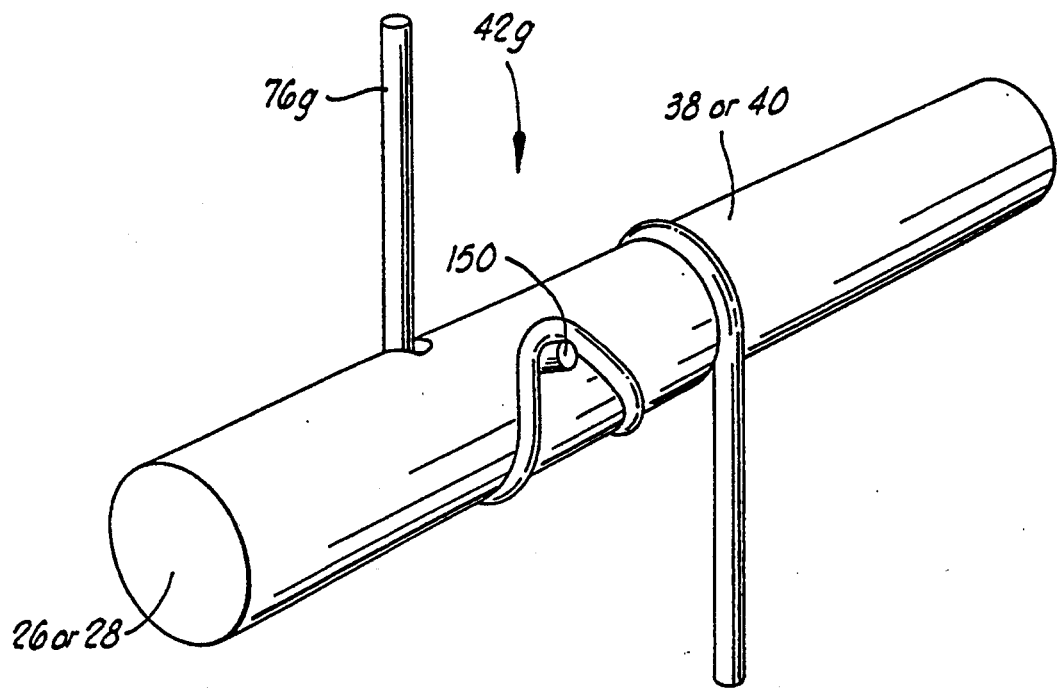
FIG. 16 is another view of a first or second torque bar having a modified strap wrapped thereabout in a modified manner.

Shown in FIG. 16 is a modified strap 76g. The modified strap 76g is wrapped about the torque bar 26 or 28 in a manner exactly like that described before with respect to the strap 76f shown in FIG. 15. However, the strap 76g has a circularly shaped cross section. This embodiment of the strap 76g having the circularly shaped cross section is useful only in accordance with the present invention when the strap 76g is constructed of Kevlar ® fibers or the equivalent cord constructed of Kevlar ® fibers is commercially available from Bally Ribbon Mills.

As shown in the drawings and as described before, the torque bar suspension scale 10 includes two torque bars 26 and 28. In some embodiments, only a single torque bar may be utilized. Further, there are compound torque bar scales or multi stage torque bar scales such as the torque suspension scales described in "Multiple Stage Torsion-Bar Weighing Apparatus", U.S. Ser. No. 07/641,949, filed Jan. 16, 1991, which specification hereby is incorporated herein by reference. The present invention also is intended to cover the use of straps in such compound torque bar suspension scales at any one or all of the stages of such compound torque bar suspension scales.

In one embodiment, the torque suspension scale may comprise a signle torque bar having one or more platforms or weight support means connected independently to the signle torque bar by way of the straps of the present invention. Assuming the platforms were rectangularly shaped, one side of the platforms would be connected to the torque bar by way of the straps in the opposite sides of the platforms would be pivotally supported. It should be noted that all of the platforms do not have to be pivotally supported as long as they are symmetrical in the sense that they will hang from the single torque bar in a suitable manner for weighing objects. In these instances, the single torque bar output would sum the weights supported on each of the platforms.

Changes may be made in the construction and the operation of the various components, elements and assemblies described herein without departing from the spirit and scope of the invention as defined in the following claims.

What is claimed is:

1. A torque bar suspension scale for weighing an object comprising:
   a frame;
   a platform having a first end and a second end and an upper surface for supporting the objects to be weighed;
   a torque bar having a first end and a second end, the torque bar being disposed near the first end of the platform; and
   a strap assembly connected to the platform and the torque bar and the frame for rotatingly supporting the torque bar whereby the torque bar is rotated in a direction in response to an object being disposed on the platform for weighing, the strap assembly comprising:
      a strap having a substantially rectangular shaped cross section having a width and a thickness and comprising a plurality of individual strands woven and interconnected to form the strap wherein the strands are constructed of Kevlar ® fibers; and
      a clamp assembly connecting the strap to the torque bar, the frame and the platform.

2. A scale for weighing an object comprising:
   a frame;
   a platform having a first end and a second end and an upper surface for supporting the objects to be weighed;
   at least one bar having a first end and a second end, the bar being disposed near the first end of the platform; and
   at least one strap assembly connected to the platform and the bar and the frame for supporting the bar, the strap assembly comprising:
      a strap comprising a plurality of individual strands woven and interconnected to form the strap wherein the strands are constructed of Kevlar ® fibers; and
      a clamp assembly connecting the strap to the bar, the frame and the platform.

3. The scale of claim 2 wherein the strap has a substantially circularly shaped cross section.

4. The scale of claim 2 wherein the strap has a substantially rectangular shaped cross section having a width and a thickness.

5. The scale of claim 4 wherein the width of the strap is at least two times the thickness of the strap.

6. The scale of claim 4 wherein the width of the strap is from about two times to about 25 times the thickness of the strap.

* * * * *

UNITED STATES PATENT AND TRADEMARK OFFICE
CERTIFICATE OF CORRECTION

PATENT NO. : 5,384,437
DATED : January 24, 1995
INVENTOR(S) : John Paul et al.                    Page 1 of 6

It is certified that error appears in the above-identified patent and that said Letters Patent is hereby corrected as shown below:

In the drawings, please add the numbers -- 52 -- and -- 54 -- to Figure 1 as indicated below.

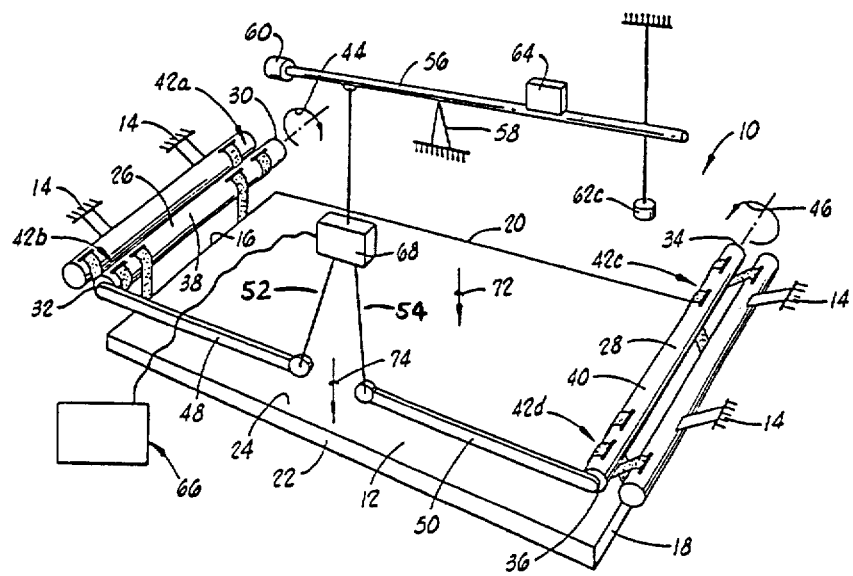

FIG. 1

UNITED STATES PATENT AND TRADEMARK OFFICE
CERTIFICATE OF CORRECTION

PATENT NO. : 5,384,437
DATED : January 24, 1995
INVENTOR(S) : John Paul et al.

It is certified that error appears in the above-identified patent and that said Letters Patent is hereby corrected as shown below:

Column 1, line 9, after "5,308,935" please insert -- issued May 3, 1994 --.

Column 1, line 12, please delete "U.S. Pat. No. 5,230,395".

Column 1, line 44, please insert -- line -- before "4-4".

Column 1, line 51, please delete the word "claim" and substitute therefor -- clamp --.

Column 1, line 54, please delete the word "claim" and substitute therefor -- clamp --.

Column 1, line 55, after the word "view" please insert -- of --.

Column 1, line 62, after the word "modified"
insert -- clamp --.

Column 1, line 66, please delete "FIG. 14" and substitute therefor -- FIG. 12 --.

Column 1, line 67, please delete the word "a" and substitute therefor -- an --.

Column 2, line 20, please delete "platform 14" and substitute therefor -- platform 12 --.

UNITED STATES PATENT AND TRADEMARK OFFICE
CERTIFICATE OF CORRECTION

PATENT NO. : 5,384,437

DATED : January 24, 1995

INVENTOR(S) : John Paul et al.

It is certified that error appears in the above-identified patent and that said Letters Patent is hereby corrected as shown below:

Column 2, line 30, please delete "respect" and substitute therefor -- respective --.

Column 2, line 30, after "16" please insert -- and 18 --.

Column 3, line 11, please delete "cable" and substitute therefor -- cables --.

Column 3, lines 65-66, please delete "Adrian J. Paul, Co., Inc." and substitute therefor -- Adrian J. Paul Company --.

Column 4, lines 7-8, please delete "Adrian J. Paul, Co., Inc." and substitute therefor -- Adrian J. Paul Company --.

Column 4, lines 12-13, please delete "circularly cross section" and substitute therefor -- circular cross sections --.

Column 4, line 24, please delete "outer most" and substitute therefor -- outermost --.

Column 4, line 26, please delete "break" and substitute therefor -- broke --.

UNITED STATES PATENT AND TRADEMARK OFFICE
CERTIFICATE OF CORRECTION

PATENT NO. : 5,384,437
DATED : January 24, 1995
INVENTOR(S) : John Paul et al.

It is certified that error appears in the above-identified patent and that said Letters Patent is hereby corrected as shown below:

Column 4, line 36, please delete "is" and substitute therefor -- was --.

Column 5, line 9, please delete "strap 78a" and substitute therefor -- 76a --.

Column 5, line 10, please delete "strap 78a" and substitute therefor -- 76a --.

Column 5, line 50, please delete "cold" and substitute therefor -- coal --.

Column 5, line 67, please delete "second 88" and substitute therefor -- second end 88 --.

Column 7, line 3, please delete "frame 12" and substitute therefor -- frame 14 --.

Column 7, line 8, both occurrences delete "platform 14" and substitute therefor -- platform 12 --.

Column 7, line 21, please delete "straps 76" and substitute therefor -- straps 76a --.

Column 7, line 24, please delete "clamp assembly 76a" and substitute therefor -- clamp assembly 78a --.

UNITED STATES PATENT AND TRADEMARK OFFICE
CERTIFICATE OF CORRECTION

PATENT NO. : 5,384,437
DATED : January 24, 1995
INVENTOR(S) : John Paul et al.

It is certified that error appears in the above-identified patent and that said Letters Patent is hereby corrected as shown below:

Column 7, lines 43-44, please delete "strap 78b" and substitute therefor -- strap 76a --.

Column 7, line 47, please delete "strap 78b" and substitute therefor -- strap 76a --.

Column 7, line 56, please delete "strap 78b" and substitute therefor -- strap 76b --.

Column 7, line 57, please delete "strap 78b" and substitute therefor -- strap 76b --.

Column 8, line 29, please delete "strap 78a" and substitute therefor -- strap 76a --.

Column 8, line 30, please delete "strap 78a" and substitute therefor -- strap 76a --.

Column 8, line 33, please delete "straps 78a" and substitute therefor -- strap 76a --.

Column 8, line 41, please delete "strap 78a" and substitute therefor -- strap 76b --.

Column 8, line 43, please delete "strap 78a" and substitute therefor -- strap 76b --.

Column 9, lines 10-11, please delete "torque bars 26 or 29" and substitute therefor -- torque bars 26 or 28 --.

UNITED STATES PATENT AND TRADEMARK OFFICE
CERTIFICATE OF CORRECTION

PATENT NO. : 5,384,437
DATED : January 24, 1995
INVENTOR(S) : John Paul et al.

It is certified that error appears in the above-identified patent and that said Letters Patent is hereby corrected as shown below:

Column 10, line 31, please delete "clamp assembly 76" and substitute therefor --clamp assembly 78 --.

Column 10, line 48, please delete "fibers is" and substitute therefor -- fibers, --.

Column 10, line 64, please delete "signle" and substitute therefor -- single --.

Column 10, line 66, please delete "signle" and substitute therefor -- single --.

Signed and Sealed this

Sixth Day of June, 1995

Attest:

BRUCE LEHMAN

*Attesting Officer*     *Commissioner of Patents and Trademarks*